(12) United States Patent
Lux et al.

(10) Patent No.: US 11,485,040 B2
(45) Date of Patent: Nov. 1, 2022

(54) GUIDE BAR FOR A MOTOR CHAINSAW AND METHOD FOR PRODUCING A GUIDE BAR

(71) Applicant: Andreas Stihl AG & Co. KG, Waiblingen (DE)

(72) Inventors: Thomas Lux, Alfdorf (DE); Martin Leiendecker, Göppingen (DE); David Mitrega, Winnenden (DE)

(73) Assignee: Andreas Stihl AG & Co. KG, Waiblingen (DE)

(*) Notice: Subject to any disclaimer, the term of this patent is extended or adjusted under 35 U.S.C. 154(b) by 196 days.

(21) Appl. No.: 16/937,618

(22) Filed: Jul. 24, 2020

(65) Prior Publication Data
US 2021/0023734 A1    Jan. 28, 2021

(30) Foreign Application Priority Data
Jul. 26, 2019 (EP) ..................................... 19188621

(51) Int. Cl.
*B27B 17/02*    (2006.01)
*B23D 57/02*    (2006.01)

(52) U.S. Cl.
CPC ............ *B27B 17/02* (2013.01); *B23D 57/023* (2013.01)

(58) Field of Classification Search
None
See application file for complete search history.

(56) References Cited

U.S. PATENT DOCUMENTS

| 2,962,812 | A | * | 12/1960 | Gommel | ............... | B27B 17/025 |
| | | | | | | 83/820 |
| 3,241,228 | A | * | 3/1966 | Rayniak | ............... | B23K 31/025 |
| | | | | | | 30/387 |
| 4,138,813 | A | | 2/1979 | Harada et al. | | |
| 4,269,100 | A | | 5/1981 | Deelman et al. | | |
| 4,641,432 | A | | 2/1987 | Kume | | |
| 4,965,934 | A | | 10/1990 | Eriksson et al. | | |
| 5,052,109 | A | | 10/1991 | Vanderzanden et al. | | |

(Continued)

FOREIGN PATENT DOCUMENTS

DE    7219952    8/1972
EP    3 769 923 A1 *    1/2021

(Continued)

*Primary Examiner* — Hwei-Siu C Payer
(74) *Attorney, Agent, or Firm* — Gudrun E. Huckett (57) ABSTRACT

A guide bar for motor chainsaws has side plates and a middle section between the side plates connected fixedly and non-movably to the side plates. The side plates form a clamping section and a deflection section opposite the clamping section. A guide groove extends circumferentially about the guide bar. The middle section forms the guide groove bottom in the deflection section. A guide bar tip is located where the longitudinal center axis of the guide bar intersects the deflection section. The side plates each have a guide surface extending continuously across a first longitudinal side of the guide bar, the deflection section, and a second longitudinal side of the guide bar. The guide surfaces of the side plates have hardened regions at the first and second longitudinal sides and at the guide bar tip with a hardness greater than a hardness of a middle region of the side plates.

14 Claims, 2 Drawing Sheets

(56) References Cited

U.S. PATENT DOCUMENTS

| | | | |
|---|---|---|---|
| 5,093,998 A * | 3/1992 | Seigneur | B27B 17/02 30/387 |
| 5,144,867 A * | 9/1992 | Yajima | B23K 31/025 30/387 |
| 5,448,929 A * | 9/1995 | Sundstrom | B27B 17/025 164/80 |
| 5,561,908 A | 10/1996 | Leini | |
| 5,596,811 A | 1/1997 | Payne | |
| 5,943,782 A * | 8/1999 | Leini | C21D 1/10 30/387 |
| 2010/0229406 A1 | 9/2010 | Ruth | |
| 2013/0031793 A1 | 2/2013 | Baratta | |

FOREIGN PATENT DOCUMENTS

| | | |
|---|---|---|
| FR | 1378471 | 11/1964 |
| WO | 93/08968 | 5/1993 |

* cited by examiner

GUIDE BAR FOR A MOTOR CHAINSAW AND METHOD FOR PRODUCING A GUIDE BAR

BACKGROUND OF THE INVENTION

The invention relates to a guide bar for a motor chainsaw, wherein the guide bar comprises a clamping section and a free end, wherein at the free end a deflection section is arranged. The guide bar comprises two one-piece side plates, wherein the side plates extend from the clamping section to the deflection section and form the deflection section. The guide bar comprises a circumferentially extending guide groove. The guide bar comprises a middle section arranged between the side plates, wherein the middle section forms the bottom of the guide groove in the deflection section. The middle section is connected fixedly and non-movably to the side plates. The guide bar comprises a guide bar tip where a longitudinal center axis of the guide bar intersects the deflection section. The guide bar comprises a first longitudinal side and a second longitudinal side. Each side plate comprises a guide surface which extends continuously across the first longitudinal side of the guide bar, the deflection section, and the second longitudinal side of the guide bar.

The invention further relates to a method for producing a guide bar.

Guide bars for motor chainsaws are subject to great wear during operation. Particularly the deflection section of the guide bar is subjected to great wear due to the high mechanical load in operation. For reducing wear, it is known in the prior art to arrange at the guide bar tip a rotatably supported nose sprocket at the deflection section. US 2010/0229406 discloses moreover that at the guide bar tip a hardened insert or the like is provided. The construction of such guide bars is however comparatively complex.

U.S. Pat. No. 4,269,100 discloses a guide bar in which the side plates extend from the clamping section to the deflection section; the side plates form the deflection section. In regard to the prior art, it is disclosed herein that the deflection region in guide bars can be hardened.

The invention has the object to provide a guide bar of the aforementioned kind that is of a simple configuration and exhibits reduced wear.

A further object of the invention resides in providing a method for producing such a guide bar.

SUMMARY OF THE INVENTION

In accordance with the invention, this is achieved in regard to the guide bar in that the guide surfaces of the side plates comprise, at the longitudinal sides as well as at the guide bar tip, at least one hardened region with increased hardness compared to a middle region of the side plates.

In regard to the method for producing a guide bar, the object is solved by a method wherein the guide bar is inductively hardened at the longitudinal sides as well as at the guide bar tip.

It has been found that by hardening the guide surfaces formed at the side plates at the longitudinal sides as well as at the guide bar tip a significant reduction of the susceptibility of the guide bar to wear can be achieved. At the longitudinal sides as well as at the guide bar tip, a guide bar has preferably at least one hardened region with increased hardness compared to the middle region of the side plates. The middle region of the side plates comprises at least the region in which the longitudinal center axis of the guide bar, in a side view perpendicular to the plane of the side plates, extends in a longitudinal section of the guide bar which is arranged between the clamping section and the deflection section. The hardness of the middle region of the side plates corresponds preferably to the hardness of the base material of the side plates prior to hardening at the longitudinal sides and at the guide bar tip.

The guide bar comprises a middle section that is arranged between the side plates and forms the bottom of the guide groove in the deflection section. The middle section is fixedly and non-movably connected to the side plates. In this context, the middle section can be formed integrally at least partially at one or both side plates. However, the middle section can be embodied also at least partially as a separate plate which is arranged between the side plates. The plate which forms the middle section is non-movably connected to the two side plates, for example, by welding. The guide bar comprises no rotatably supported nose sprocket. The guide bar comprises advantageously no movable parts. The region of the guide bar which forms the bottom of the guide groove is non-movably arranged relative to the side plates. The saw chain is bordered across the length of the guide groove by sidewalls and a bottom of the guide groove. The bottom of the guide groove is the region which in operation with a saw chain is arranged adjacent to the drive member of the saw chain and delimits the guide groove. The bottom and the groove sides of the guide groove form an outwardly open U. Into this U, a saw chain can project with its drive members. The drive members project to a location close to the bottom of the guide groove.

The depth of the guide groove is preferably approximately identical across the entire length of the guide groove. The depth of the guide groove changes across the length of the guide groove preferably by less than 3 mm, in particular less than 2 mm. A saw chain arranged at the guide bar is supported at the guide surfaces of the side plates at the longitudinal sides as well as in the deflection region. In contrast thereto, the saw chain in guide bars with nose sprocket is lifted off the side plates and is supported with the depth limiter at the nose sprocket. The guide situation changes therefore in the deflection region. The guide bar according to the invention is however provided, at the longitudinal sides as well as in the deflection region, with the same type of guiding action for the saw chain, i.e., a guiding action at the guiding surfaces of the side plates.

The middle region extends advantageously between the longitudinal sides of the guide bar across at least 50%, in particular at least 80%, of the height of the guide bar. The height of the guide bar in this context is measured parallel to the plane of the guide bar and perpendicularly to the longitudinal axis of the guide bar.

The guide surfaces are the surfaces at which the saw chain is supported at the guide bar. The saw chain is guided at the guide surfaces along the entire deflection region. Advantageously, the saw chain is supported at the guide surfaces also across the entire length of the longitudinal section at both longitudinal sides of the guide bar. The longitudinal section extends in this context between deflection section and clamping section and adjoins the deflection section and the clamping section. In an advantageous embodiment, the guide surfaces extend continuously and without interruption at a longitudinal side from the clamping section across the longitudinal section to the deflection section, across the entire deflection section, and at the other longitudinal side from the deflection section across the longitudinal section back to the clamping section.

The hardened region comprises advantageously a depth that is measured perpendicularly to the guide surface and amounts to at least 0.5 mm. The depth preferably amounts to at least 1 mm. Preferably, the depth is less than 20 mm. The depth of the hardened region is preferably smaller than the depth of the guide groove. The hardened region thus does not extend all the way to the bottom of the guide groove.

In an advantageous embodiment, an intermediate region extends at the guide surfaces between the longitudinal sides and the deflection section, respectively; the intermediate section has a reduced hardness compared to the hardened region. The intermediate region enables a very simple manufacture of the hardened regions at the longitudinal sides and at the deflection section. The hardened regions at the longitudinal sides and at the deflection section can be produced such that the hardened regions overlap each other, in particular slightly. The overlap region forms the intermediate region because the two hardening zones influence each other mutually so that a reduced hardness results in the intermediate region. The intermediate region is preferably arranged at a distance from the guide bar tip. The intermediate region is preferably positioned such that in the intermediate region a comparative minimal load is to be expected. The intermediate region is preferably arranged at a distance from the guide bar tip which amounts to 40% to 70% of the height of the guide bar. The height of the guide bar is measured in this context at a side plate, i.e., a flat side of the guide bar, and parallel to the plane of the guide bar and perpendicularly to the longitudinal center axis of the guide bar. The plane of the guide bar is the plane which contains the longitudinal center axis and extends centrally between the side plates, i.e., parallel to the outer sides of the guide bar. The flat side of the guide bar forms an outer side of the guide bar which extends at the side plate.

The deflection section is preferably defined as the region which extends from the guide bar tip to a plane which extends perpendicularly to the longitudinal center axis through the point at which the radius of at least one guide surface amounts to 100 mm. The deflection section extends across the region of the guide bar arranged at the free end of the guide bar in which the radius of the guide surfaces amounts to less than 100 mm. The region of the guide bar where the guide surfaces have a radius of more than 100 mm is therefore no longer considered a part of the deflection section. In this region outside of the deflection section, the guide surfaces extend comparatively straight and follow approximately the course of the longitudinal center axis of the guide bar. At the transition from the deflection section to the longitudinal section, the radius of the guide surfaces changes from a radius smaller than 100 mm to a radius that is larger than 100 mm. The intermediate region is preferably arranged such that it is arranged at least partially outside of the deflection section.

A longitudinal section is preferably provided between the deflection section and the clamping section. Preferably, at least 10%, in particular at least 50%, preferably at least 90%, of the length of the intermediate region measured parallel to the longitudinal center axis is located within the longitudinal section. Since the intermediate region is located at least partially, in particular across at least 10%, preferably across significantly more than 10% of its length, outside of the deflection section, it is achieved that the guide surface in the deflection section is formed to a large extent by the hardened region. In this way, the wear at the free end of the guide bar can be reduced. Advantageously, the intermediate region comprises a length measured parallel to the longitudinal center axis of less than 20 mm. Since the intermediate region is embodied comparatively short, a hardened guiding surface at both side plates can be achieved to a large extent by a simple hardening process. Preferably, the length of the intermediate region is less than 15 mm, preferably less than 10 mm.

The depth of the intermediate region which is measured perpendicularly to the guide surface is preferably smaller than the depth of the guide groove. The intermediate region therefore does not project all the way to the bottom of the guide bar. The depth of the intermediate region amounts to preferably less than 20%, in particular less than 10%, preferably less than 5%, of the height of the guide bar.

The guide bar comprises a middle section which is arranged between the side plates. The middle section is fixedly and non-movably connected to the side plates. A rotatably supported nose sprocket is not present. The middle section forms the bottom of the guide groove in the deflection section. The bottom of the guide groove is preferably embodied continuously at the middle section and extends from the clamping section across the longitudinal section to the deflection section and, at the oppositely positioned longitudinal side of the guide bar, from the deflection section across the longitudinal section to the clamping section and is only interrupted by possibly present oil supply openings.

In an advantageous embodiment, the middle section is embodied as a one-piece element together with at least one side plate of the guide bar. Particularly advantageously, both side plates and the middle section are embodied together as one piece. However, it can also be provided that the middle section and one of the side plates are formed together as one piece and the other side plate is embodied separately; or a first part of the middle section is formed together with one side plate as one piece and a second part of the middle section is formed together with the other side plate as one piece.

In an advantageous alternative embodiment, it can be provided that the middle section and the side plates are embodied separate from each other. The middle section is in particular embodied as a middle plate which is arranged between the side plates. The middle section and the side plates are advantageously connected to each other by weld spots. The hardened region is preferably arranged a distance from the weld spots. The distance between the hardened region and the weld spots amounts to advantageously at least 3 mm, advantageously at least 5 mm.

In regard to a method for producing a guide bar for a motor chainsaw, it is provided that the guide bar is inductively hardened at the longitudinal sides as well as at the guide bar tip. Inductive hardening can be performed in a simple way.

Preferably, in a first method step the guide bar tip is hardened and in a second method step that is performed temporarily separate therefrom the longitudinal sides are hardened. Hardening of the longitudinal sides is realized in this context in particular after hardening of the guide bar tip. In an alternative embodiment, it can however also be provided that hardening of the longitudinal sides is carried out prior to hardening of the guide bar tip. Hardening of the deflection section is realized in a first hardening zone and hardening of the longitudinal sides is realized in at least one second hardening zone. The first hardening zone and the at least one second hardening zone overlap each other advantageously in at least one overlap region. After hardening of one of the hardening zones of the first hardening zone and the second hardening zone, the material in the overlap region during hardening of the other one of the hardening zones of the first hardening zone and of the second hardening zone is heated again and thereby annealed. In this way, the intermediate region is formed. Due to reheating and annealing of the already hardened intermediate region, a reduced hardness of the intermediate region compared to the hardened region is produced.

Preferably, both longitudinal sides are hardened simultaneously. In this way, minimal processing times for the hardening process can be obtained. The longitudinal sides are preferably hardened in a continuous process in which the guide bar is moved in the direction of the longitudinal center axis past two inductors which, in regard to the longitudinal center axis, are stationary but are movable transversely to the longitudinal center axis. The arrangement of the inductors so as to be movable transversely to the longitudinal center axis makes it possible that the inductors can follow the curvature of the guide bar in the longitudinal section as the guide bar moves past the inductors. The inductors in this context are movable in particular perpendicularly to the longitudinal center axis. In this way, a constant depth of the hardened regions can be achieved within the limits of the obtainable tolerances. Preferably, at least one part of the deflection section that comprises the guide bar tip is hardened with an inductor whose shape is matched to the shape of the part of the deflection section that is to be hardened. An inductor whose shape is matched to the shape of the part to be hardened is also referred to as shaped inductor. With two inductors which are arranged at the longitudinal sides of the guide bar, a circumferential hardening of the deflection section is not possible without problems. An inductor moving past the entire longitudinal side and the deflection section of the guide bar causes a longer processing time. A problem of a shaped inductor is that the entire contour to be hardened is simultaneously hardened and therefore the energy introduced into the guide bar is very high. Since only the deflection section is hardened with a shaped inductor while the longitudinal sides of the guide bar are hardened by a continuous process, the energy introduction into the guide bar during hardening can be kept at an acceptable level and the required processing time is kept at a minimum at the same time.

The present method for producing a guide bar provides that the assembled guide bar is locally inductively hardened. Accordingly, instead of individual parts of the guide bar that are not yet assembled, for example, side plates of the guide bar, being hardened and subsequently assembled, the finish-assembled guide bar as a whole is locally hardened. In this way, hardened regions are produced at the guide surfaces at both side plates at the same time. This also leads to a reduction of the processing time.

Advantageously, the guide bar comprises a middle section arranged between the side plates which forms in the deflection section the bottom of the guide groove. The middle section is advantageously connected fixedly and non-movably to the side plates before the guide bar is inductively hardened at the longitudinal sides and at the guide bar tip.

DESCRIPTION OF THE PREFERRED EMBODIMENTS

Figure 1:
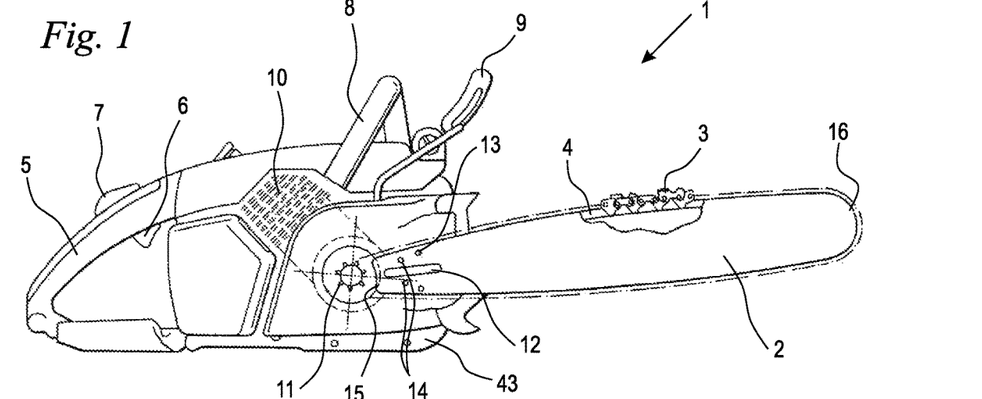
FIG. 1 is a schematic side view of a motor chainsaw with a guide bar arranged thereat.

FIG. 1 shows schematically a motor chainsaw 1 comprising a guide bar 2. The guide bar 2 comprises a guide groove 4 in which a saw chain 3 is guided in circulation. The saw chain 3 is guided across a drive pinion 11 which in operation is rotatingly driven by a drive motor 10 and in this way moves the saw chain 3 in circulation about the circumference of the guide bar 2. The drive motor 10 is schematically illustrated in FIG. 1 as an internal combustion engine. The drive motor 10 however can also be an electric motor which is supplied with energy by a rechargeable battery or by a power cord. The guide bar 2 comprises a clamping end 15 with which the guide bar 2 is secured at a housing 43 of the motor chainsaw 1. The drive pinion 11 is positioned adjacent to the clamping end 15. The end of the guide bar 2 which is remote from the housing 43 forms a free end 16 at which the saw chain 3 is deflected. The guide bar 2 comprises near the clamping end 15 a guide slot 12 through which clamping elements, not illustrated, project with which the guide bar 2 is fixed at the housing 43 of the motor chainsaw 1. The guide bar 2 comprises advantageously at least one, in the embodiment two, clamping openings 14 where non-illustrated clamping means for tensioning the saw chain 3 by movement of the guide bar 2 relative to the housing 43 can engage. In the embodiment, the guide bar 2 comprises also at least one oil supply opening 13 by means of which lubricant such as oil can be introduced into the guide groove 4 from the exterior side of the guide bar 2.

For guiding the motor chainsaw 1 in operation, the motor chainsaw 1 comprises a handle 5 at which operating elements 6 and 7 are supported. The operating element 6 can be, for example, a throttle trigger and the operating element 7 can be a throttle trigger lock. For guiding the motor chainsaw 1, there is also a grip 8 provided that extends across the housing 43. At the side of the grip 8 which is facing the guide bar 2, a hand guard 9 is provided which can also serve for triggering a chain brake device, not illustrated.

Figure 2:
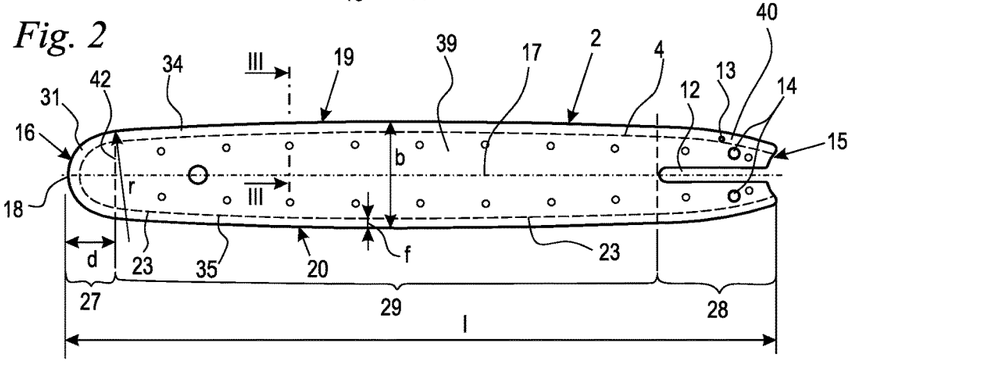
FIG. 2 is a side view of a guide bar.

FIG. 2 shows the guide bar 2 in detail. The guide groove 4 comprises a groove base 23 which is indicated in FIG. 2 by a dashed line. The guide bar 2 comprises a longitudinal center axis 17 which extends from the clamping end 15 to the free end 16 of the guide bar 2 at the geometric center of the guide bar 2. The guide bar 2 comprises a clamping section 28 which extends, beginning at the clamping end 15, across the entire length section of the guide bar 2 in which the guide slot 12 is arranged. The guide slot 12 can be, as illustrated in FIG. 2, open toward the clamping end 15 or, as illustrated in FIG. 1, can be closed toward the clamping end 15. The clamping openings 14 are also arranged in the clamping section 28. Advantageously, the at least one oil supply opening 13 is also arranged in the clamping section 28. The clamping section 28 ends at the end of the guide slot 12 which is facing the free end 16 of the guide bar 2. An oil bore region 40 extends in the region of the oil supply opening 13 and will be explained in more detail in the following.

The guide bar 2 comprises a first longitudinal side 19 and a second longitudinal side 20 along which the guide groove 4 extends. At the first longitudinal side 19, the saw chain 3 (FIG. 1) moves in operation from the clamping end 15 to the free end 16 and at the second longitudinal side 20 the saw chain 3 moves in operation from the free end 16 to the clamping end 15. At the free end 16 of the guide bar 2, a deflection section 27 is provided. The guide bar 2 comprises a guide bar tip 18. The guide bar tip 18 is the region in which the longitudinal center axis 17 intersects the deflection section 27 in the side view illustrated in FIG. 2. The side view illustrated in FIG. 2 is a view perpendicular onto the flat side of the guide bar 2. The deflection section 27 extends in the direction of the longitudinal center axis 17 from the guide bar tip 18 to a plane 42. The plane 42 is the virtual plane which is positioned perpendicularly to the longitudinal center axis 17 and, in a side view onto the flat side of the guide bar 2, as illustrated in FIG. 2, extends through the point where the outer contour of the guide bar 2 comprises a radius r of 100 mm. In the deflection section 27, the radius r is smaller than 100 mm. In the direction of the longitudinal center axis 17, a longitudinal section 29 extends between the deflection section 27 and the clamping section 28. In the longitudinal section 29, the radius r of the outer contour of the guide bar 2 is greater than 100 mm. The deflection section 27 extends preferably across a length d which is measured parallel to the longitudinal center axis 17 and which amounts to preferably between 5% and 20% of the total length l of the guide bar 2. The total length l is measured in this context parallel to the longitudinal center axis 17. The longitudinal sides 19 and 20 extend in the longitudinal section 29 as well as in the clamping section 28 at the circumference of the guide bar 2. The circumference of the guide bar 2 in the deflection section 27 connects the two longitudinal sides 19 and 20.

Figure 3:
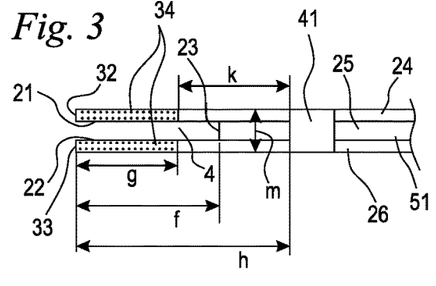
FIG. 3 is a schematic section illustration of the guide bar in a section along the section line III-III in FIG. 2.

In the region of the guide groove 4, the guide bar 2 has hardened regions 31, 34, 35. A first hardened region 31 is to a large extent or completely located in the deflection section 27. A second hardened region 34 extends at the first longitudinal side 19 of the guide bar 2, and a third hardened region 35 extends at the oppositely positioned second longitudinal side 20 of the guide bar 2. At least the region of the longitudinal section 29, in which, in a view perpendicular onto the flat side of the guide bar 2, the longitudinal center axis 17 extends, forms a middle region 39 of the side plates 24, 26. In the embodiment, the middle region 39 extends at least in the region that is enclosed by the groove base 23 of the guide groove 4 in a view perpendicular onto the flat side of the guide bar 2. In the hardened regions 31, 34, and 35, the hardness relative to the middle region 39 of the side plates 24, 26 is increased. The hardness in at least one, in particular all, hardened regions 31, 34, and 35 amounts advantageously to at least 600 HV10, in particular at least 630 HV10. The middle region 39 which comprises compared to the hardened regions 31, 34, and 35 a reduced hardness extends preferably across the entire thickness m of the guide bar 2 which is indicated in FIG. 3. The hardness in the middle region 39 amounts advantageously to 400 HV10 to 600 HV10, in particular 420 HV10 to 460 HV10. The guide bar 2 comprises advantageously below the groove base 23 in the deflection section 27 and in the longitudinal section 29 a reduced hardness compared to its circumference where the guide surfaces 32 and 33 extend. Due to the groove base 23 being configured so as to extend to a large extent circumferentially, the region below the groove base 23 is the region which is enclosed by the groove base 23.

FIG. 2 shows also that the guide bar 2 has a height b which is measured perpendicularly to the longitudinal center axis 17 and in the plane of the guide bar 2. The height b is significantly smaller than the total length l of the guide bar 2. The middle region 39 extends, in a side view perpendicular onto the flat side of the guide bar 2, advantageously across at least 50%, in particular across at least 80%, of the height b of the guide bar 2. The thickness m is measured perpendicularly to the height b and perpendicularly to the longitudinal center axis 17. The guide groove 4 comprises a depth f. The depth f can amount to, for example, 0.5 cm to 2 cm. The depth f of the guide groove 4 is advantageously approximately identical across the entire length of the guide groove 4. The depth f of the guide groove 4 changes across the longitudinal section 29 at the first longitudinal side 19, across the deflection section 27, and across the longitudinal section 29 at the second longitudinal side 20, in particular across the entire length of the guide groove 4, preferably by less than 3 mm, in particular less than 2 mm.

FIG. 3 shows in a schematic section illustration the configuration of the guide bar 2 of a first embodiment. The guide bar 2 in the embodiment according to FIG. 3 is constructed of a first side plate 24, a second side plate 26 as well as a middle plate 51 arranged between the side plates 24 and 26. The middle plate 51 forms a middle section 25. The middle plate 51 is preferably embodied as a continuous plate. The guide bar 2 is embodied as a solid bar, i.e., made of solid material without weight-reducing cutouts in the middle region 39 of the side plates 24, 26 or in the middle section 25. The two side plates 24, 25 and the middle plate 51 are connected to each other by a plurality of weld spots 41. The arrangement of the weld spots 41 is illustrated schematically in FIG. 5.

As shown in FIG. 3, a guide surface 32 or 33 is formed at the circumferential contour of each side plate 24 and 26. The guide surfaces 32 and 33 support the saw chain 3 at the longitudinal sides 19 and 20 as well as at the deflection section 27. The first side plate 24 delimits a first groove side 21 of the guide groove 4 with its inner side and comprises at its circumference the first guide surface 32. The second side plate 26 delimits a second groove side 22 and comprises at its outer circumference the second guide surface 33. The groove base 23 which extends from the first side plate 24 to the second side plate 26 is formed by the middle section 25. The groove base 23 forms the bottom of the guide groove 4. The groove base 23 forms together with the groove sides 21 and 22 an outwardly open U which delimits the guide groove 4 across the entire length of the guide groove 4 in the clamping section 28, in the longitudinal section 29, and in the deflection section 27. The groove base 23 is connected across the entire length of the guide groove 4 fixedly and non-movably to the groove sides 21 and 22. The groove base 23 does not move relative to the groove sides 21 and 22. A rotatable nose sprocket which forms the bottom of the guide groove 4 within the deflection section 27 is not present. The weld spots 41 are positioned relative to the guide surfaces 32 and 33 at a distance h; the distance h is measured perpendicularly to the guide surfaces 32, 33. The distance h is greater than the depth f of the guide groove 4. The weld spots 41 extend thus below the groove base 23. In the embodiment, the weld spots 41 extend across the entire thickness m of the guide bar 2.

In FIG. 3, the hardened region 34 which adjoins the guide surfaces 32 and 33 and extends across the entire thickness m of the guide bar 2 is schematically illustrated as a dotted region. The hardened region 34 extends through both side plates 24 and 26 and is interrupted by the guide groove 4.

The hardened region 34 does not extend however all the way to the groove base 23. The hardened region 34 comprises advantageously a hardness of at least 600 HV10, in particular at least 630 HV10. The hardened region 34 comprises a depth g measured perpendicularly to the guide surfaces 32, 33 which is smaller than the depth f of the guide groove 4. The depth g amounts advantageously to at least 1 mm, in particular at least 1.5 mm. The hardened region 34 is positioned at a distance k relative to the weld spots 41; the distance k is measured perpendicularly to the guide surfaces 32, 33. The distance k amounts advantageously to at least 6 mm, in particular at least 8 mm.

Figure 4:
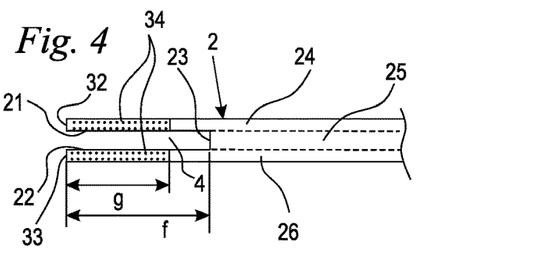
FIG. 4 is a further embodiment of the guide bar in section illustration corresponding to FIG. 3.

FIG. 4 shows a configuration for an alternative embodiment of the guide bar 2. The guide bar 2 illustrated in FIG. 4 comprises side plates 24 and 26 that are formed as one piece together with the middle section 25. Weld spots 41 are therefore not provided in this embodiment. Configuration and dimensions of the guide surfaces 32, 33, of the guide groove 4 as well as of the hardened region 34 correspond to the configuration and dimensions described in connection with FIG. 3.

The hardened regions 31 and 35 have a depth g which corresponds to the depth g of the hardened region 34 illustrated and described in connection with FIGS. 3 and 4. The depth f of the guide groove 4 is preferably constant to a large extent across the entire length of the guide groove 4. Constant to a large extent means herein that the depth f of the guide groove 4 across the entire length of the guide groove 4 varies by at most 10% of the average depth f of the guide groove 4. Only in the region of the oil supply openings 13 or the like a deviating depth f of the guide groove 4 may be provided.

In an alternative embodiment, it can be provided that the middle section 25 is embodied as one piece together with one of the side plates 24 and 26 and is connected with the other one of the side plates 24, 26, for example, by weld spots 41. Alternatively, it can also be provided that a part of the middle section 25 is embodied as one piece together with the side plate 24 and a further part of the middle section 25 is embodied as one piece together with the side plate 26, and the two side plates 24 and 26 are connected to each other by weld spots 41.

Figure 5:
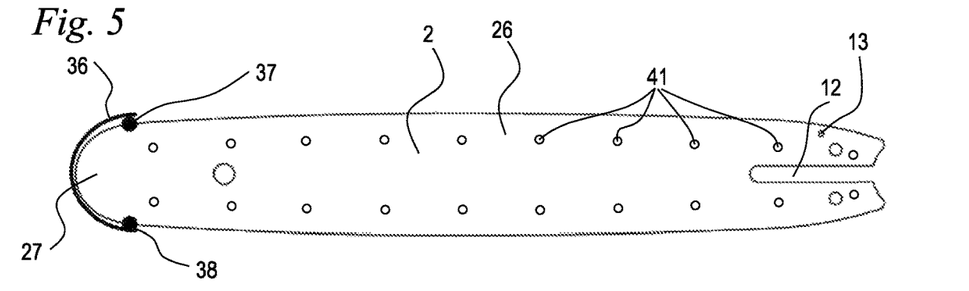
FIG. 5 is a schematic side view of a guide bar during hardening of the deflection section in a first method step.

FIG. 5 shows schematically the guide bar 2 during manufacture. The side plates 24 and 26 and the middle section 25 are connected already by weld spots 41. In a first hardening step, the hardened region 31 in the deflection section 27 is produced. For this purpose, the guide bar 2 is partially inductively hardened. In the embodiment, an inductor 36 is provided for this purpose. The inductor 36 is preferably a so-called shaped inductor whose shape is matched to the shape of the part of the deflection section 27 that is to be hardened. By means of the inductor 36, the entire region 31 is simultaneously inductively heated and thereby hardened. In a first hardening step, the guide bar 2 is only locally hardened, i.e., at the circumference of the free end 16. Hardening is realized at least at the guide bar tip 18, advantageously about at least 75%, in particular about 100%, of the circumference of the deflection section 27. It can be expedient that in the first hardening step also the longitudinal sides 19, 20 are hardened in a portion of the longitudinal section 29 which immediately adjoins the deflection section 29.

Figure 6:
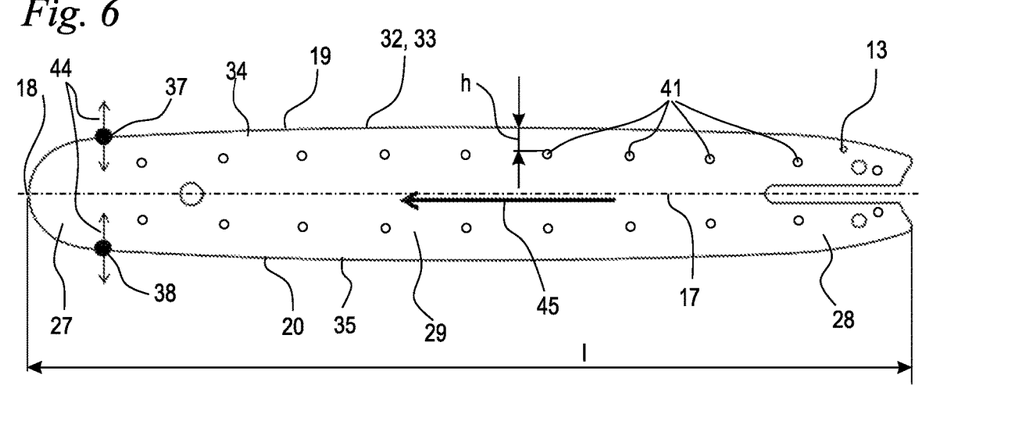
FIG. 6 is a schematic side view of the guide bar of FIG. 5 during hardening of the longitudinal sides in a second method step.

In FIG. 5, two inductors 37 and 38 are in addition illustrated which are used after hardening of the hardened region 31 at the deflection section 27. This is illustrated schematically in FIG. 6. The inductors 37 and 38 extend only across a minimal portion of the total length l of the guide bar 2. Hardening of the longitudinal sides 19 and 20 is realized preferably after hardening of the guide bar tip 18. The hardened regions 34 and 35 are preferably inductively hardened in a continuous process. In the continuous process, the guide bar 2 moves advantageously in the direction of arrow 45 past the inductors 37 and 38. In order to be able to compensate the different height b of the guide bar 2 across its total length l perpendicular to the longitudinal center axis 17, the inductors 37 and 38 are movable in the direction of double arrows 44 perpendicularly to the longitudinal center axis 17. In this way, the inductors 37 and 38 can follow the course of the guide surfaces 32 and 33. The hardened regions 34 and 35 which are produced by the inductors 37 and 38 do not extend all the way to the weld spots 41. The guide bar 2 is hardened in the second hardening step only locally, namely at its circumference at the longitudinal sides 19 and 20. Hardening is realized at least about 75%, in particular 100%, of the circumferential length of the longitudinal sides 19 and 20, respectively. It can be expedient that in this context also a portion of the deflection section 27 immediately adjoining the longitudinal sides 19, 20 is hardened.

Figure 7:
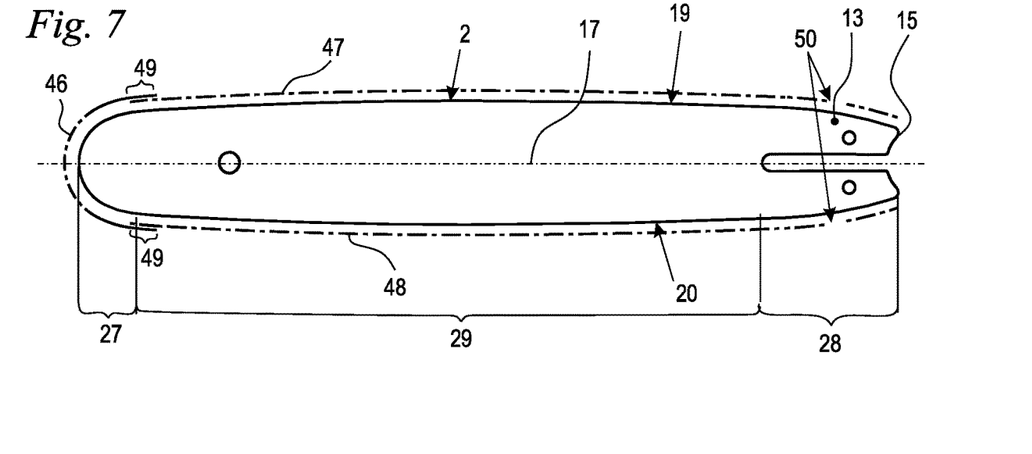
FIG. 7 is a schematic illustration of the regions of the guide bar which are hardened with the different inductors.
Figure 8:
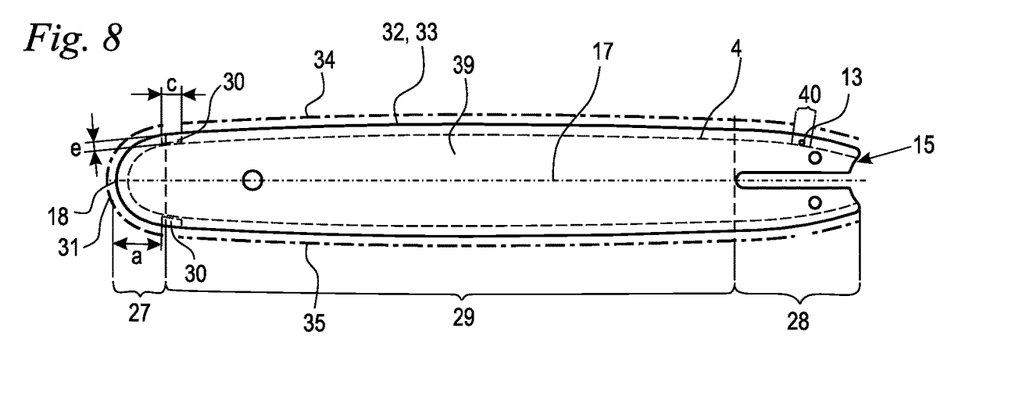
FIG. 8 is a schematic illustration of the resulting hardened regions and of the intermediate region of the guide bar after the hardening processes.

FIG. 7 shows the hardening zones 46, 47, and 48 where the inductors 36, 37, and 38 have acted on the guide bar 2. The hardening zone 46 extends preferably across a major portion of the deflection section 27. In the embodiment, the hardening zone 46 where the inductor 36 heats the guide bar 2 extends about the entire deflection section 27 and into the longitudinal section 29. The hardening zones 47 and 48 begin in the deflection section 27 in the embodiment. However, it can also be provided that the hardening zones 47 and 48 begin at the longitudinal section 29. The hardening zones 47 and 48 extend preferably all the way to the clamping end 15 of the guide bar 2. In the region of the oil supply opening 13, the hardening zone 47 has an interruption 50. For producing the interruption 50, the inductor 37 is briefly switched off when the oil supply opening 13 is moved past the inductor 37. In this way, the oil bore region 40, schematically indicated in FIG. 8, is produced whose hardness is less than the hardness of the hardened regions 31, 34, and 35. The hardness of the oil bore region 40 corresponds preferably to the hardness of the middle region 39. As shown also in FIG. 7, at the oppositely positioned longitudinal side 20 an interruption 50 is provided which is produced by switching off the inductor 38. The interruption 50 at the second longitudinal side 20 is provided in the region of an oil supply opening 13 (not illustrated in FIG. 7) which is introduced from the exterior side of the guide bar that cannot be seen. The second oil supply opening 13 is arranged at the location of the illustrated oil supply opening 13 and serves for supplying oil when the guide bar 2 is turned by 180° about its longitudinal center axis 17.

FIG. 8 shows schematically the position of the hardened regions 31, 34, and 35 at the outer circumference of the guide bar 2 by dash-dotted lines. Actually, the hardened regions 31, 34, and 36 are located in the side plates 24 and 26, as illustrated in FIGS. 3 and 4. The hardened zones 46 and 47; 46 and 48 overlap each other respectively in an overlap region 49. In the overlap region 49, the material of the guide bar 2 is hardened first by the inductor 36 and subsequently annealed by being heated again by the inductors 37 and 38. In this way, the hardness in the overlap regions 49 is reduced again. In the overlap regions 49, intermediate regions 30 of the guide bar 2 are therefore formed which extend at the guide surfaces 32 and 33 between the hardened regions 31 and 34; 31 and 35. At least one intermediate region 30, preferably both intermediate regions 30, are positioned preferably at a distance a relative to the guide bar tip 18 which amounts to 40% to 70% of the height b of the guide bar 2. The intermediate region 30 comprises preferably a length c, measured parallel to the longitudinal axis 17, of less than 20 mm, in particular less than 15 mm, preferably less than 10 mm. The depth e of the intermediate region 30 measured perpendicularly to the guide surface 32, 33 is preferably smaller than the depth f of the guide groove 4. The depth e of the intermediate region 30 amounts to preferably less than 20% of the height b of the guide bar 2.

The hardness in the intermediate region 30 is preferably greater than the hardness in the middle region 39 but smaller than the hardness in the hardened regions 31, 34, and 35. The hardness in the intermediate region 30 can also correspond to the hardness in the middle region 39. Accordingly, the intermediate region 30 is first hardened relative to the middle region 39. This increased hardness decreases partially or completely upon subsequent annealing. The hardness of the intermediate region 30 can be lowered to the hardness of the middle region 39. The hardness of the intermediate region 30 after hardening and annealing can correspond to the hardness of the intermediate region 30 prior to hardening. The hardness in the intermediate region 30 amounts advantageously to at least 400 HV10, in particular at least 440 HV10. The interruptions 50 form oil bore regions 40 in the region of the at least one oil supply opening 13 in which the hardness corresponds preferably to the hardness of the base material, i.e., the hardness of the middle region 39. The hardness in the at least one oil bore region 40 is preferably less than the hardness in the at least one intermediate region 30.

Preferably, both longitudinal sides 19, 20 are simultaneously hardened. However, it can also be provided that the two longitudinal sides 19 and 20 are sequentially hardened, preferably also in a continuous process. The inductors 37 and 38 are preferably stationarily arranged in the direction of the longitudinal center axis 17.

In an advantageous alternative embodiment, the second hardening step is carried out temporally before the first hardening step. Accordingly, at least a major portion of the longitudinal sides 19 and 20 is hardened and in a temporally subsequent method step the guide bar tip 18 and at least a portion of the deflection region 27 are hardened.

The specification incorporates by reference the entire disclosure of European priority document 19 188 621.7 having a filing date of Jul. 26, 2019.

While specific embodiments of the invention have been shown and described in detail to illustrate the inventive principles, it will be understood that the invention may be embodied otherwise without departing from such principles.

What is claimed is:

1. A guide bar for a motor chainsaw, the guide bar comprising:
    a first one-piece side plate and a second one-piece side plate;
    a middle section arranged between the first and second side plates, wherein the middle section is connected fixedly and non-movably to the first and second side plates;
    wherein the first and second side plates form a clamping section of the guide bar and a deflection section at a free end of the guide bar, wherein the free end is arranged opposite the clamping section along a longitudinal center axis of the guide bar;
    a guide groove extending circumferentially about the guide bar, wherein the middle section forms a bottom of the guide groove in the deflection section;
    a guide bar tip located at the deflection section where the longitudinal center axis of the guide bar intersects the deflection section;
    wherein the first and second side plates each comprise a guide surface extending continuously across a first longitudinal side of the guide bar, across the deflection section, and across a second longitudinal side of the guide bar;
    wherein the guide surfaces of the first and second side plates comprise at least one hardened region at the first and second longitudinal sides and at the guide bar tip, respectively, wherein the at least one hardened region comprises a hardness which is greater than a hardness of a middle region of the first and second side plates, respectively;
    wherein the guide surfaces comprise a first intermediate region between the first longitudinal side and the deflection section and a second intermediate region between the second longitudinal side and the deflection section, respectively, wherein the first and second intermediate regions have a reduced hardness compared to the hardness of the at least one hardened region.

2. The guide bar according to claim 1, wherein the first and second intermediate regions are arranged at a distance from the guide bar tip, wherein the distance is measured parallel to the longitudinal center axis of the guide bar, wherein the distance amounts to 40% to 70% of a height of the guide bar.

3. The guide bar according to claim 1, wherein the deflection section extends from the guide bar tip to a plane which extends perpendicularly to the longitudinal center axis through a point where a radius of at least one of the guide surfaces amounts to 100 mm, wherein the first and second intermediate regions are arranged at least partially outside of the deflection section.

4. The guide bar according to claim 1, wherein the first and second intermediate regions comprise a length measured parallel to the longitudinal center axis of less than 20 mm.

5. The guide bar according to claim 1, wherein the first and second intermediate regions comprise a depth measured perpendicularly to the guide surfaces, wherein the depth is smaller than a depth of the guide groove.

6. The guide bar according to claim 1, wherein a depth of the first and second intermediate regions amounts to less than 20% of a height of the guide bar.

7. The guide bar according to claim 1, wherein the middle section and at least one of the first and second side plates together form a one-piece element.

8. The guide bar according to claim 7, wherein the middle section and the at least one of the first and second side plates are embodied separate from each other and are connected to each other by weld spots.

9. The guide bar according to claim 8, wherein the at least one hardened region is arranged at a distance relative to the weld spots.

10. A method for producing a guide bar for a motor chainsaw, wherein the guide bar comprises a first one-piece side plate and a second one-piece side plate; wherein the first and second side plates form a clamping section of the guide bar and a deflection section at a free end of the guide bar, wherein the free end is arranged opposite the clamping section along a longitudinal center axis of the guide bar; wherein a guide groove extends circumferentially about the guide bar; wherein a guide bar tip is located at the deflection section where the longitudinal center axis of the guide bar intersects the deflection section; wherein the first and second side plates each comprise a guide surface extending continuously across a first longitudinal side of the guide bar, across the deflection section, and across a second longitudinal side of the guide bar; the method comprising:

inductively hardening the guide bar at the first and second longitudinal sides and at the guide bar tip to provide the guide surfaces of the first and second side plates with at least one hardened region at the first and second longitudinal sides and at the guide bar tip, respectively, wherein the at least one hardened region comprises a hardness which is greater than a hardness of a middle region of the first and second side plates, respectively;

wherein the inductively hardening comprises a step of hardening the guide bar tip with an inductor whose shape is matched to a shape of the guide bar tip and further comprises a step of hardening the first and second longitudinal sides in a continuous process by moving the guide bar in a direction of the longitudinal center axis past two inductors that are stationary in the direction of the longitudinal center axis.

11. The method according to claim 10, wherein the step of hardening the guide bar tip and the step of hardening the first and second longitudinal sides are carried out separately at different times.

12. The method according to claim 10, wherein the inductively hardening comprises hardening of the deflection section in a first hardening zone and further comprises hardening of the first and second longitudinal sides in at least one second hardening zone, wherein the first hardening zone and the at least one second hardening zone overlap in at least one overlap region so that a material in the overlap region, after hardening in one of the hardening zones of the first hardening zone and the at least one second hardening zone, is heated again during hardening of the other one of the hardening zones of the first hardening zone and the at least one second hardening zone and thereby annealed so that an intermediate region is formed.

13. The method according to claim 10, wherein the guide bar comprises a middle section arranged between the first and second side plates and forming a bottom of the guide groove in the deflection section, the method further comprising, prior to the inductively hardening, connecting the middle section fixedly and non-movably to the first and second side plates.

14. The method according to claim 10, wherein the inductively hardening includes providing the guide surfaces of the first and second side plates with the hardened regions simultaneously.

* * * * *